(No Model.)
H. WESTPHAL.
CHURN.
No. 429,707. Patented June 10, 1890.
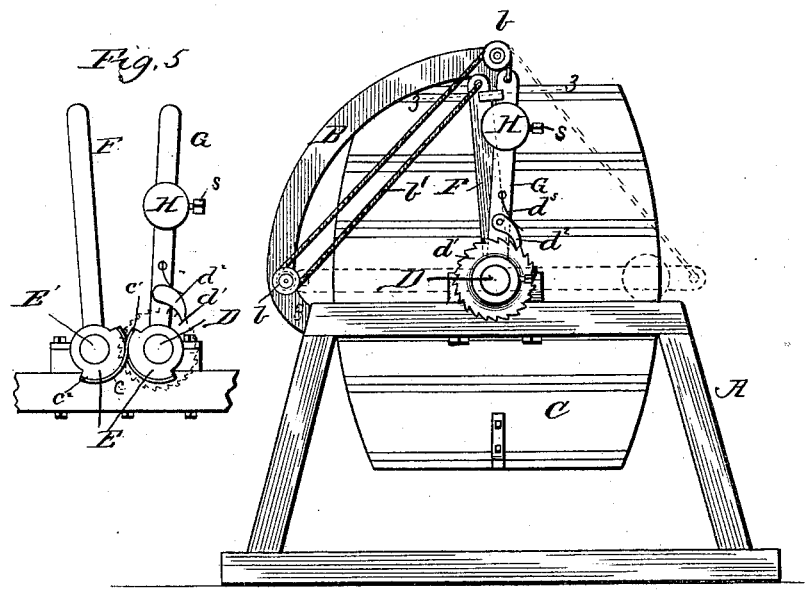
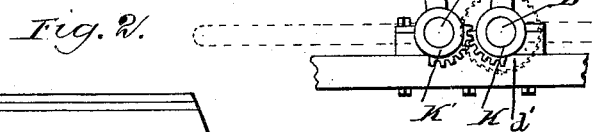
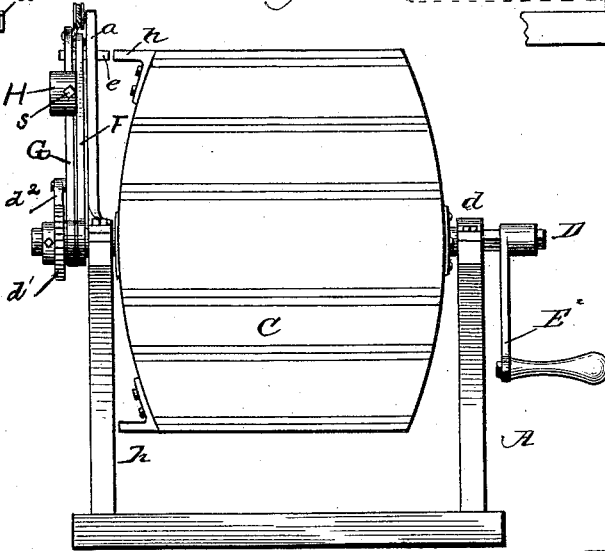
Witnesses
W. Rossiter
Fred'k H. Mills
Inventor
Henry Westphal
By Chas. C. Tillman
Atty.

UNITED STATES PATENT OFFICE.

HENRY WESTPHAL, OF CHICAGO, ILLINOIS.

CHURN.

SPECIFICATION forming part of Letters Patent No. 429,707, dated June 10, 1890.

Application filed May 11, 1889. Serial No. 310,360. (No model.)

*To all whom it may concern:*

Be it known that I, HENRY WESTPHAL, a citizen of the United States, residing at Chicago, in the county of Cook and State of Illinois, have invented a certain new and useful Improvement in Churns, of which the following is a specification.

My invention relates to revoluble or rotary churns in which the process of churning is performed by rotating the entire churn, thereby dashing the cream or milk from one end of the vessel to the other; and it consists in the peculiarities of the construction and arrangements of the various parts of the same, as will be hereinafter more fully set forth and specifically claimed.

The object of my invention is to balance or equalize the weight of the milk or material, so that the revolution of the churn may be effected with little effort and with a steady and even movement, yet toss or dash the milk from end to end with the same degree of force and effect as in the present or old methods. I attain this object by the certain peculiar mechanism and constructions employed; and in order to enable others skilled in the art to which my invention pertains to make and use the same I will now proceed to describe it, referring to the accompanying drawings, in which—

Figure 1 is a side elevation of my churn; Fig. 2, a front elevation; Fig. 3, a detail horizontal section taken on line 3 3 of Fig. 1, and Figs. 4 and 5 modified forms of the gearing of my levers.

Similar letters refer to like parts throughout the different views of the drawings.

A represents the supporting or main frame, made of any suitable form or material.

B is an arm secured at its lower end to the frame and at the upper end to a standard $a$. Near each end of this arm the pulleys $b$, for the operation of the cord or belt $b'$, are journaled.

C is a vessel or milk-receptacle, preferably of barrel shape, mounted on shaft D, which shaft is journaled in suitable boxes $d$ on each side of the vessel to the supporting-frame. On one end of this shaft the crank $E^2$, or a pulley for rotating the churn is secured, and on the other end, outside of the journal-box $d$, the levers F and G are loosely mounted at their lower ends on the shaft D, which projects far enough for this purpose. The lever G has near its lower end a spring-actuated pawl $d^2$, which engages with a ratchet-wheel $d'$, rigidly secured to the shaft D, preferably on the outer side of the lever G, which lever is provided with an adjustable sliding weight H, having a set-screw $s$ for securing the weight to the lever at the desired point. To the upper end of the lever G is secured one end of the cord or belt $b'$, which passes over the pulleys $b\ b$ and is secured at the other end to the lever F, as will be more clearly seen in the drawings and more fully explained hereinafter. On each end of the vessel and on the side adjacent to the levers I provide projections $h\ h$, which when the barrel is revolved engage with the trip-pin $e$, which passes through and projects slightly on each side of the lever F, and is retained in position by a suitable spring $e'$. As is seen in Fig. 3 of the drawings, this pin is bent to form a right angle and has the end of the shorter arm beveled, so that when both of the levers are raised to a vertical position, as shown in Fig. 1, the beveled end of the pin will strike against lever G and force the pin outward or from the projection $h$ on the barrel, thus freeing the lever and allowing it to pass on until the other projection strikes the pin and in like manner raises the levers to an upright position, the spring $e'$ serving to force the pin back into position after being freed. The weight H is adjustably secured to the lever G by means of a set-screw $s$, that it may balance any given quantity of milk in the vessel.

In Fig. 5 I have shown a modified form of gearing between the levers, in which the same result will be attained as by the gearing shown in Fig. 1. In this modification I employ, as before, two levers F and G, one of them G being provided with an adjustable sliding weight H and having rigidly secured to its lower end a segment E, to which is secured a band or belt for operating the other lever, as will be presently explained. The lever G is loosely journaled on the shaft D, upon which is hung the vessel C. On the shaft D, preferably on the outer side of the lever G, I rigidly secure a ratchet-wheel, as before, and at a suitable point on the lever G is attached a spring-actuated pawl for engagement with said ratchet. The lever F has rigidly secured at its lower end a segment E, similar to the one on the end of the lever G. Said segment is loosely mounted on a shaft E', placed at a suitable distance from and at the side of the shaft D. In the drawings I have shown a segment only of a wheel, as the levers describe only a quarter of a circle in their movements, and this segment of the wheel is all that is required to operate said levers; but of course I can have the wheel entire, if so desired.

To the outer rim of each segment I secure a piece of steel band or belt $c$, one end of which is firmly secured to the segment on the lever G, as at $c'$, and the other end to the segment on the lever F, as at $c^2$, whereby when the levers are lowered to a horizontal position the band is wound on the segment on lever G and unwound from the segment on lever F, and when being raised to a vertical position the operation is reversed, as will be clearly seen.

In Fig. 4 I have shown another modification of the gearing between the levers, and in this, as in both Figs. 1 and 5, I employ two levers F and G, the lever G being provided with an adjustable sliding weight and spring-actuated pawl to engage with the ratchet-wheel $d'$, which is rigidly secured to the shaft D, as in the other figures.

At the lower end of each of the levers I provide or secure rigidly thereto cogged gears K K', which mesh with each other, as seen. The lever G is loosely journaled on the shaft D, upon which is hung the barrel or vessel, and at a suitable distance from and at the side of the shaft D, upon a shaft E', I loosely journal the lever F.

In the modifications shown in both Figs. 4 and 5 it will be noticed that I dispense with the arm B, the pulleys $b\ b$, cord or belt $b'$, and trip-pin $e$, all of which are shown and employed in the modification shown in Figs. 1 and 2. It will be further seen and understood, as shown in Figs. 4 and 5, that in the revolution of the vessel the projections $h\ h$ thereon will describe a circle around the shaft D, upon which said vessel is hung, and the lever F, being journaled a short distance from and at the side of the shaft D and out of the center of said circle, will, when lying in a horizontal position, project or extend beyond the circle, and when raised to a vertical position the end of the lever will come within the circle and allow the projection to pass over it, when it becomes free to descend to the horizontal position and again be raised by the other projection. It is therefore apparent that, the levers being geared together, as shown in each of the figures of the drawings, the raising of the lever F will also raise the weighted lever G, and that in each quarter-revolution of the vessel the levers will be in a horizontal or vertical position, and that the weighted lever G balances the weight of the milk, and that by the shifting of the weight of the milk in the vessel thus balanced and its momentum the lever G will be restored to an upright position by means of the projection $h$ on the vessel and lever F.

In the foregoing description I have spoken of my churn as a barrel-shaped one, and also of milk as the material; but of course I may use a vessel of any suitable form and for churning or mixing any kind of material. It is also obvious that by sliding the weight H on the lever G it can be adjusted to accommodate to a perfect balance any quantity of milk or material in the vessel, thereby obtaining an even and steady movement or revolution and overcoming to a great extent all inertia or resistance.

I have shown my churn with a handle for operating it; but of course I may use instead a pulley on the shaft, to which may be applied any kind of power.

As a mechanical movement my invention is applicable to various kinds of machines, and for this reason I do not wish to limit myself to churns, but may apply it to any device to which it is adapted.

Having thus fully described my invention, what I claim as new, and desire to secure by Letters Patent, is—

1. In a rotary churn, the combination of the frame A, shafts D and E', journaled on said frame, the shaft D having secured at one end a handle or pulley and rigidly secured at the other a ratchet-wheel $d'$, a vessel C, having projections $h\ h$ and mounted on said shaft, a lever G, loosely journaled on the shaft D adjacent to the ratchet-wheel and formed at its lower end with a cogged gear K, and having an adjustable sliding weight H and pawl $d^2$, and a lever F, formed with a cogged gear K' at its lower end and loosely journaled on shaft E', the levers engaging with each other by means of their cogged gears K and K', rigidly secured at their lower ends, all constructed, arranged, and operated substantially as shown and described, and for the purpose set forth.

2. In a rotary churn, the combination of a frame, a vessel movably mounted thereon and having projections $h\ h$, with two levers geared together and journaled on said frame, one of the levers having an adjustable weight and the other lever engaging intermittingly with the vessel by means of the projections thereon, all constructed, arranged, and operating substantially as shown and described, and for the purpose set forth.

In witness whereof I have hereunto set my hand and affixed my seal this 15th day of April, A. D. 1889.

HENRY WESTPHAL. [L. S.]

In presence of—
CHAS. C. TILLMAN,
FRANK T. ROBINSON.